United States Patent [19]

Ens et al.

[11] Patent Number: 5,781,655
[45] Date of Patent: Jul. 14, 1998

[54] STRAND DIMENSION SENSING

[75] Inventors: John Edward Ens, Richmond; Derek Barnes, West Vancouver, both of Canada

[73] Assignee: MacMillan Bloedel Limited, Vancouver, Canada

[21] Appl. No.: 600,079

[22] Filed: Dec. 15, 1995

[51] Int. Cl.[6] .................................................. G06K 9/52
[52] U.S. Cl. .......................... 382/141; 382/108; 382/257; 382/286; 348/135
[58] Field of Search .............................. 382/108, 111, 382/141, 152, 257, 286, 308; 358/453; 348/86, 89, 92, 135; 364/468, 473, 474.01; 356/429–431, 383, 384, 237, 238, 242; 250/227.16, 571, 572; 57/58, 83, 352

[56] References Cited

U.S. PATENT DOCUMENTS

| | | | |
|---|---|---|---|
| 4,591,995 | 5/1986 | Schürch | 382/111 |
| 4,791,481 | 12/1988 | Verdiere et al. | 348/88 |
| 4,887,155 | 12/1989 | Massen | 382/111 |
| 5,179,419 | 1/1993 | Palmquist | 382/108 |
| 5,430,808 | 7/1995 | Baird et al. | 382/176 |
| 5,436,980 | 7/1995 | Weeks et al. | 382/141 |

OTHER PUBLICATIONS

Ze–Nian Li and Danpo Zhang, "Fast Line Detection in a Hybrid Pyramid", Proceedings of Vision Interface '92, pp. 143–150, Vancouver, B.C., May 1992.

*Primary Examiner*—Christopher Kelley
*Attorney, Agent, or Firm*—C. A. Rowley

[57] ABSTRACT

Strand dimension of selected strands in a layup of strands is determined by obtaining a pixel image, analyzing the pixel image to define candidate strands to be measured and their location within the image and reprocessing the image to find the opposite end points of the candidate strands and their end edges by finding areas of appropriate dimension and substantially free of edge pixels to define a strand to be examined ("magic" strand) and then determining the length and/or width of the "magic" strand.

8 Claims, 4 Drawing Sheets

STRAND DIMENSION SENSING

FIELD OF INVENTION

The present invention relates to a system for determining strand dimension, more particularly, the present invention relates to an optical system for determining strand length and/or width of selected strands in a mat.

BACKGROUND OF THE INVENTION

In the manufacture of oriented strand board, the size of the strands may play a significant role in determining strand properties of the ultimate board. Dimensions of the strand are initially set by the knives used to cut the strands from the round wood or solid wood, i.e. both the length measured generally parallel to the grain and the width, measured generally perpendicular to the grain are determined by cutting and a bending action and the thickness of the strand is defined by the depth of penetration of the knives applied to the wood. In the course of processing these strands, they are invariably damaged in handling to some degree which results in shortening of the average length and/or width of the strands generally during each processing step.

The current system for monitoring changes in length or width require sampling of the strands at the selected location and physically (manually) measuring the dimensions of a number of strands to obtain an average based on a reasonable size sample.

Applicant has recently devised a vision system for examining the orientation of strands in a layup to define the mean angular deviation of the strands. This system uses vision analysis of a plurality of digitized frames of different portions of the surface of a mat layup after it has left the orienter, detecting the edges of strand in each image and then determining the orientation of these edges relative to a selected direction. Such a system is described in Applicant's co-pending application Ser. No. 08/522,451 filed Aug. 31, 1995 by Barnes and Ens., the teachings of which are incorporated herein by reference.

The teachings of Ze-Nian Li and Danpo Zhang in a paper titled "Fast Line Detection in a Hybrid Pyramid" describes a system for selecting lines from a digitized image containing activated and deactivated pixels.

To Applicant's knowledge, no on-line equipment or system is available for measuring the dimensions of strands that may be used at various stages of a process, for example, of making an oriented strand board (OSB) product.

BRIEF DESCRIPTION OF THE PRESENT INVENTION

It is an object of the present invention to provide an optical system for selecting strands and measuring the length and/or width of the selected strands.

It is a further object of the present invention to provide a system of determining the average length and/or width of strands based on finding the dimensions of a plurality of discrete selected strands.

Broadly, the present invention relates to a system for determining length and/or width of selected strands in a plurality of such strands comprising forming a pixel image of a plurality of said strands, the majority of which are in overlapping relationship, analyzing the pixel image to find candidate strands having dimensions within preselected ranges and define selected area of said pixel image, processing said selected areas of said pixel image to select a selected strand having dimensions within a preselected range and determining the distance between opposed edges of said selected strand to define said length and/or width measurements of said selected strands.

Preferably, said analyzing of said pixel image to define candidate strands includes forming a binary image from said pixel image reducing the binary edge image and closing the image to define selected regions substantially free of pixels, screening these regions to retain only border pixels of the region defining lines of at least a preselected length and thereby defined a candidate strand.

Preferably, said processing said selected areas to select said selected strand includes first finding edge pixels of candidate strands and finding end edges of candidate strands to form strand boxes, retaining said boxes containing less than a preselected number of edge pixels and using such candidate strands as selected strands.

Preferably, the length of said selected strands are determined by determining the distance between end edges of the selected strand.

Preferably, the width of one of said selected strands are determined by processing said pixel image in areas containing one of said selected strands to find a middle line of said one of said selected strands and expanding laterally on both sides of said middle line to define an outline and defining the opposite sides of said one of said selected strands based on the number of pixels traversed as the outline is increased and then determining the spacing between the two sides of said one of said selected strands based on when said number of pixels exceed a predetermined number.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
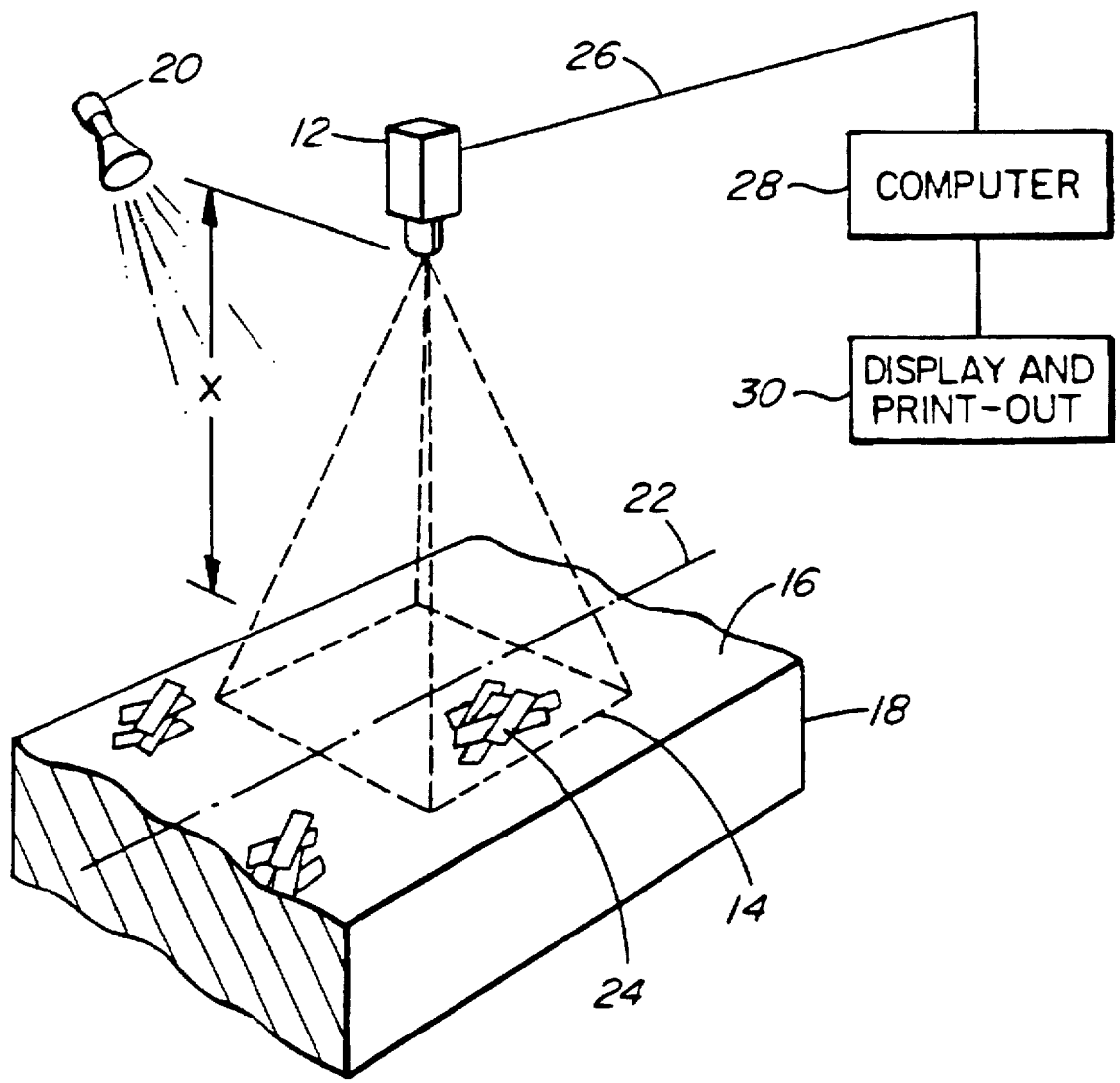
FIG. 1 is a schematic illustration of the first step in obtaining an image of the strands in a mat.
Figure 4:
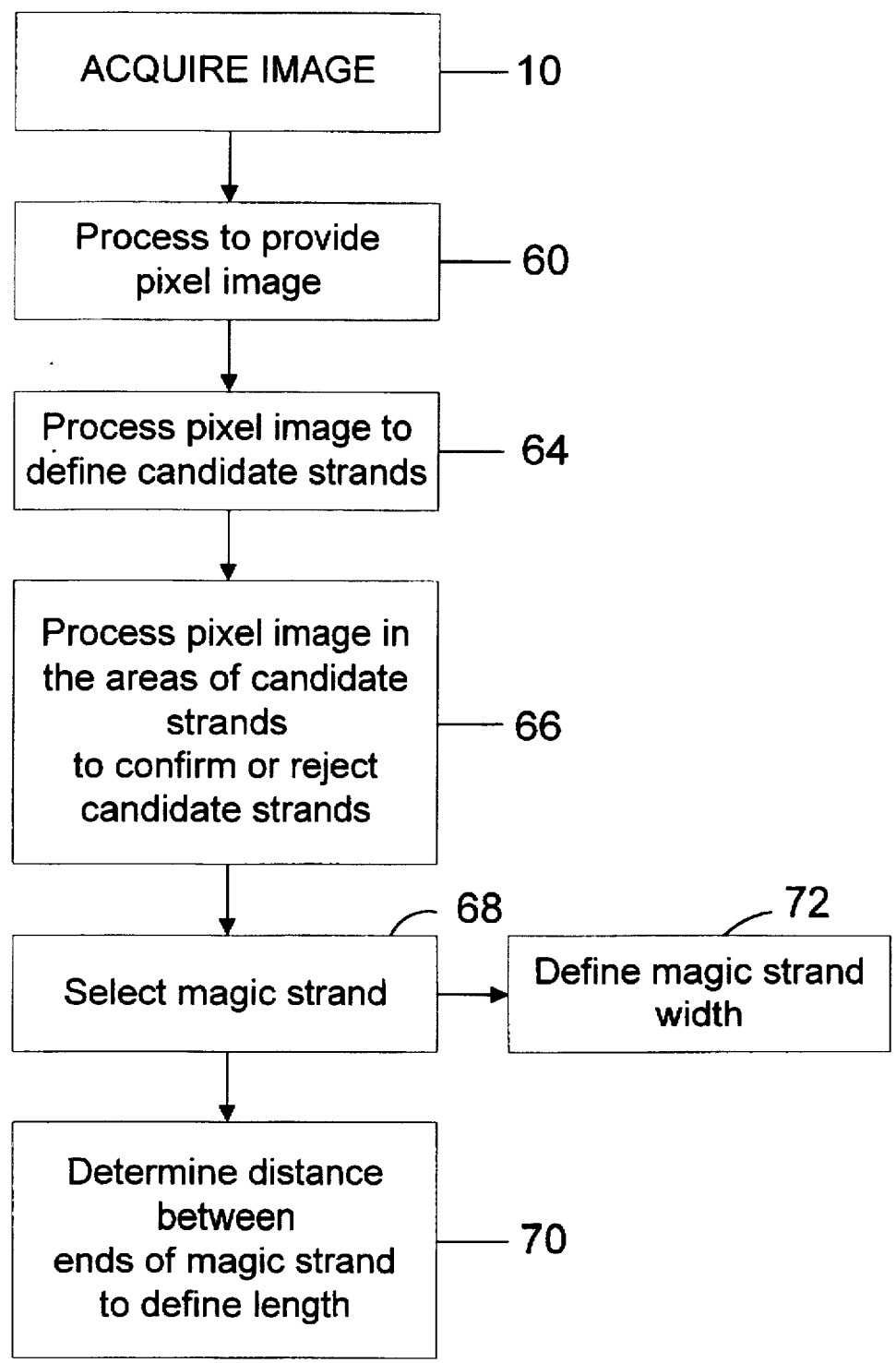
FIG. 4 is a simplified flow diagram of the present invention.
Figure 5:
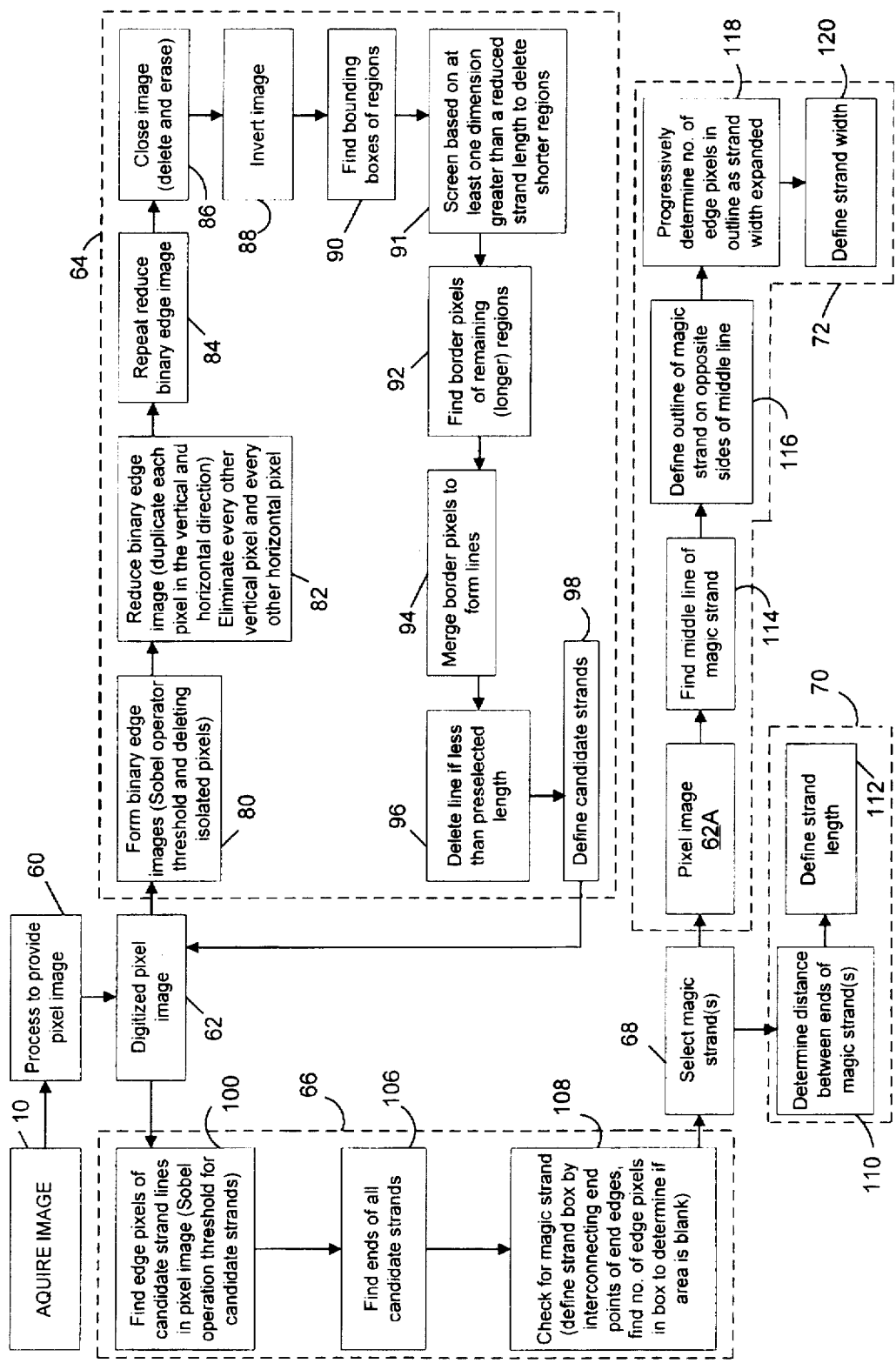
FIG. 5 is a flow diagram of the preferred system for determining strand dimensions (length and/or width).

The first step in the present invention is to obtain an image as indicated by step 10 in FIGS. 4 and 5. This is accomplished as illustrated in FIG. 1, using a camera 12 which may be either a line camera or a frame taking camera. If a line camera is used, an image will be formed by accumulating sufficient lines to provide the desired size of image or frame.

The area 14 shown in dot-dash lines in FIG. 1 of the surface 16 of a layup or the like 18 of strands is illuminated by side lumination from a light source 20 so that shadows are cast along at least one side edge of each of the strands, i.e. the light 20 projects light or directs light onto the surface 16 to illuminate the area 14 from a direction preferably substantially perpendicular to the longitudinal axis 22 and from above the surface 16 so that side edges of the strand such as the strand 24 on the side of the strand remote from the light 20 cast a shadow or darken line along that edge. The camera 12 takes a picture or image of the area 14 and these shadows show as lines darker than the adjacent portion of the strand. Obviously, only the top layer(s) of strands will be examined.

The height of the camera 12 above the surface 16 as indicated by the dimension x is known and the focal angle is also known and therefore the size of the area 14 which is represented on the plane 16 (top of the layup) is also known so that the spacing of the pixels is known and represent a known length of the plane 16 or in the area 14.

Information from the cameras 12 as indicated by a line 26 is delivered to a programmed computer 28 that carries out the various steps in the process and then displays the end results or prints out the end result as indicated at 30.

Figure 2:
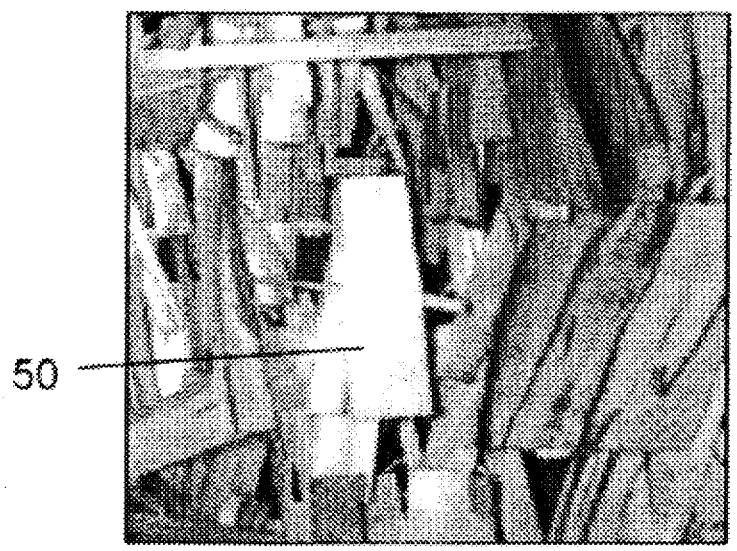
FIG. 2 is a visual image of a typical mat of strand showing a selected strand ("magic" strand), the dimensions of which is to be determined.

A typical image is illustrated in FIG. 2 and includes, as an example, a selected strand or which will hereinafter be referred to as a "magic" strand, sits above all the other strands in the mat so that it is substantially fully exposed and thereby provides a complete strand, the length and width of which may be accurately measured. This strand is illustrated at 50 in FIGS. 2 and 3. The image of FIG. 2 is then digitized preferably by utilizing a Sobol operator with, for example, a 3×3 convolutional kernel to calculate the horizontal and vertical gradient. Pixels are then thresholded based on their Sobol gradient which reduces number of pixels that are retained so that the pixels remaining in effect represent edges of the various strands in the image. The threshold value is set to eliminate pixels representing grain structure of the wood and may require tuning when the species to be processed is changed.

Figure 3:
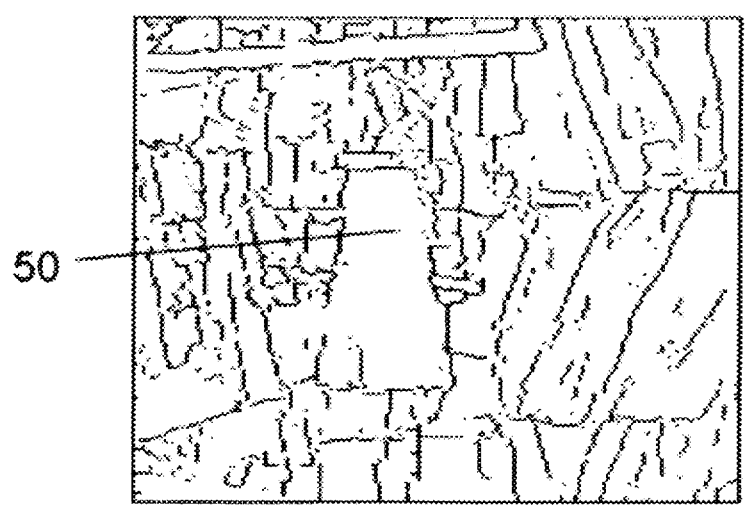
FIG. 3 is a digitized pixel image based on the image shown in FIG. 2.

It will be noted from FIGS. 2 and 3 that the selected strand or "magic" strand 50 stands out in the picture as a blank area substantially free of pixels. The present invention is based on finding such blank areas of appropriate size to select selected or "magic" strands, the dimensions are then measured to obtain the length and/or width of these selected "magic" strands.

Basically, the selection of a selected strand is accomplished by acquiring an image as indicated at 10 in FIGS. 4 and 5 which is processed as indicated at 60 to provide a pixel image 62 (see FIG. 5) by, as above described, applying a Sobol operator and thresholding.

Referring now to FIG. 4, the pixel image 62 so formed is then processed as indicated at 64 to define or determine the candidate strands that may be selected or "magic" strands to be measured and thereby define areas in the pixel image that require further examination. The pixel image is then processed in the areas of the candidate strands to confirm or reject candidate strands as indicated at 66 and thereby select a "magic" strand 68. The "magic" or selected strand is then examined to determine the distance between its ends to find the length of the "magic" strand as indicated at 70 and/or define the width of the "magic" strand by determining the distance between opposite sides of the "magic" strand as indicated at 72 and as will be described in more detail hereinbelow.

Referring to FIG. 5, the preferred system for determining a selected candidate strand is contained within the box 64 shown in dash lines in FIG. 5.

As indicated at 80, the pixel image is processed to provide binary edge images using a Sobol operator to calculate the horizontal and vertical gradients and the pixels are thresholded based on the Sobol gradients using a preselected threshold value as described above. Isolated pixels that are not interconnected with any other pixels are deleted. Thus, those pixels having a Sobol gradient below the selected threshold value are turned off as are isolated pixels not connected with another pixel.

The binary image so formed is reduced preferably twice, for example, a field of view of 200×200 pixels is reduced to 50×50 pixels. Each reduction involves two steps.

First, all pixels that are on are duplicated in both the horizontal and vertical direction, for example, to the right and to the bottom, and second, the activated pixels (on) are reduced by discarding every other activated pixel in the horizontal and vertical directions. This process is repeated twice. The step of duplicating the pixels both vertically and horizontally ensures that features are not lost during the second step (see boxes 82 and 84 in FIG. 5).

Next, it is preferred to clean the image by a one pass of a binary morphologic close operator. The close operator has two steps: dilation and erosion. Dilation tends to increase the number of pixels that are on. For each pixel in the image, a 3×3 pixel area around that pixel is examined. If any of the nine pixels are on, then the center pixel is set on. Erosion tends to contract the pixels that are on. For each pixel in the image, a 3×3 pixel area around that pixel is examined. If any of the nine pixels are off, then the center pixel is set off. The close operator thus merges regions with many edges into blobs thereby retaining large blank regions (although reduced in size) (see box 86).

The areas of interest are the blank areas and therefore the image is inverted as indicated at 88. Now, all the pixels of interest are on and the size of the areas or regions are determined by forming minimum rectangular bounding boxes around each contiguous region as indicated at 10.

Next, the so found bounding boxes are screened by dimension and those with at least one dimension of the bounding box greater than a preselected length for a reduced strand are left on, and the others are turned off. The preset value for the length of reduced strand is less than the value of the minimum strand length that will be accepted but is greater than the width of the strands at that scale. Obviously, the preset value of length it is scaled to compensate for the reduction process (see box 91).

Next, the border pixels around each of the regions (see box 92) are found and are merged into lines (see box 94) using the hierarchal merge routine, for example, as described in Applicant's said co-pending application Ser. No. 08/522,451 filed Aug. 31, 1995 by Barnes and Ens, the breakdown of which is incorporated herein by reference.

These so formed lines are then scaled preferably to real world dimensions and if they are less than the predetermined minimum strand length as preset by the operator based on the normal lengths of the strand in use, they are deleted as indicated at 96.

The remaining lines are deemed as defining one side of the candidate strands as indicated at 98.

The pixel image is then further analyzed in the area of the defined candidate strand lines by first finding the edge pixels in the pixel image using a Sobol operator and thresholding as indicated at 100. This step is similar to the step 80 described above. Next, the candidate end strands are found as indicated at 106 by searching in an area surrounding each end of each candidate strand line based on the expected angle (perpendicular to the candidate strand line) to find end edges in an area of about 50×50 pixels that are centered at the end point of the candidate strand lines. To be accepted as an end edge, the line so found must have a length greater than a minimum strand width as predefined by the operator for the particular strands being investigated and the angle of the line must be within the θ tolerance of the expected angle of the end line. i.e. substantially perpendicular, e.g. between 80° and 100° relative to the side edge of that candidate strand. If they meet both criteria, they are considered candidate strand end lines.

A crucial test to select a "magic" or selected strand is to join matching end points of the two end lines on one side edge to form a quadrilateral and count the number of edge pixels inside this quadrilateral. If the number of edge pixels is less than the average width of the quadrilateral multiplied by a constant then the areas are considered to be blank and this remains is determined to be a "magic" strand as shown at 108. The value of the constant has been experimentally determined by examining a number of typical images and selecting a constant that reflected the average amount of void in the images. This noise can be caused by grain variations in the strands or other particulate matter. A value of 1.0 was selected for strands with a normal length of 6 inches.

It is also preferred to apply an overlap test routine wherein the end points of side lines of pairs of adjacent "magic" strands, i.e. define the ends of four line segments describing the periphery of the strands for all possible combinations. If one line from a strand crosses a line from a second strand of any pair of strands, the strands are discarded as overlapping. If there is no crossing of the lines, the strand is deemed to be a selected or "magic" strand.

After the "magic" strand has been selected, the length of the "magic" strand may be determined as indicated by the box 70 by first determining the length between the ends of the "magic" strands, i.e. the end edges as found in box 106 by determining the pixels facing between the end edges as indicated at 110, generally by finding the center of the two end edges and measuring the number of pixels on a straight line interconnecting these centers, thereby define the strand length as indicated at 112.

If it is desired to obtain the strand width, again using the pixel image as indicated at 62A, a middle line of the "magic" strand is obtained as indicated at 114 in a manner similar to that done in 110 and define the outline of the "magic" strand on opposite sides of the middle line. i.e. by using the middle line and expanding laterally in directions substantially perpendicular to the middle line on opposite sides of the middle line as indicated by the box 116.

As the outline of the "magic" strand is increased by expanding laterally on opposite sides of the middle line, the number of pixels within the outline of the "magic" strand are counted as indicated by the box 118 as the box is expanded. When the total number of pixels counted is larger than a preselected threshold, the expansion is terminated and the space between the expanded edges is defined as the strand width as indicated at 120. The threshold is experimentally determined in the same manner as the constant referred to on the previous page and has been found to be about 0.25 times the measured strand length for strands with a normal length of 6 inches.

In order to provide most meaningful results, the lengths and/or widths of at least 30 different "magic" strands are averaged to provide a value for length and/or width.

Having described the invention, modifications will be evident to those skilled in the art without departing from the scope of the invention as defined in the appended claims.

We claim:

1. A method for determining length and/or width of selected strands in a plurality of such strands comprising obtaining a pixel image of a plurality of said strands the majority of which are in overlapping relationship, analyzing said pixel image to find edge pixels and to find candidate strands having dimensions within preselected ranges and to define selected areas of said pixel image by defining regions substantially free of edge pixels, processing said selected areas of said pixel image to select a selected strand having dimensions within a preselected range and determining the distance between opposed edges of said selected strand to define said length and/or width measurements of said selected strands and wherein said analyzing of said pixel image to find edge pixels includes forming a binary image from said pixel image reducing said image and closing said binary image to define said regions substantially free of edge pixels, screening said selected areas to retain only edge pixels of regions defining lines of at least a preselected length and thereby define a candidate strand.

2. A method as defined in claim 1 wherein said processing said selected areas to select said selected strand includes finding end edges of said candidate strands to form strand boxes, retaining said strand boxes containing less than a preselected number of edge pixels and using such candidate strands as selected strands.

3. A method as defined in claim 1 wherein the length of said selected strands are determined by determining the distance between end edges of the selected strand.

4. A method as defined in claim 2 wherein the length of said selected strands are determined by determining the distance between end edges of the selected strand.

5. A method as defined in claim 1 wherein the width of one of said selected strands are determined by processing said pixel image in areas containing one of said selected strands to find the middle line of said one of said selected strands and expanding laterally on both sides to the middle line to define an outline and defining the opposite sides of said one of said selected strands based on the number of pixels traversed as the outline is increased and then determining the spacing between the two sides of one of said selected strands when said number of pixels exceed a predetermined number.

6. A method as defined in claim 2 wherein the width of one of said selected strands are determined by processing said pixel image in areas containing one of said selected strands to find the middle line of said one of said selected strands and expanding laterally on both sides to the middle line to define an outline and defining the opposite sides of said one of said selected strands based on the number of pixels traversed as the outline is increased and then determining the spacing between the two sides of one of said selected strands when said number of pixels exceed a predetermined number.

7. A method as defined in claim 3 wherein the width of one of said selected strands are determined by processing said pixel image in areas containing one of said selected strands to find the middle line of said one of said selected strands and expanding laterally on both sides to the middle line to define an outline and defining the opposite sides of said one of said selected strands based on the number of pixels traversed as the outline is increased and then determining the spacing between the two sides of one of said selected strands when said number of pixels exceed a predetermined number.

8. A method as defined in claim 4 wherein the width of one of said selected strands are determined by processing said pixel image in areas containing one of said selected strands to find the middle line of said one of said selected strands and expanding laterally on both sides to the middle line to define an outline and defining the opposite sides of said one of said selected strands based on the number of pixels traversed as the outline is increased and then determining the spacing between the two sides of one of said selected strands when said number of pixels exceed a predetermined number.

* * * * *